United States Patent [19]

Wilson et al.

[11] Patent Number: 5,281,097
[45] Date of Patent: Jan. 25, 1994

[54] THERMAL CONTROL DAMPER FOR TURBINE ROTORS

[75] Inventors: Paul S. Wilson, Fairfield; Dean A. Rankey; Monty L. Shelton, both of Cincinnati; Thomas T. Wallace, Maineville, all of Ohio

[73] Assignee: General Electric Company, Cincinnati, Ohio

[21] Appl. No.: 979,026

[22] Filed: Nov. 20, 1992

[51] Int. Cl.⁵ ............................................. F01D 5/26
[52] U.S. Cl. .................... 416/193 A; 416/95; 416/220 R; 416/500; 415/115; 415/116
[58] Field of Search ............... 415/115, 116; 416/95, 416/193 A, 219 R, 220 R, 500

[56] References Cited

U.S. PATENT DOCUMENTS

| | | |
|---|---|---|
| Re. 32,339 | 1/1987 | Jones et al. . |
| 2,999,631 | 9/1961 | Wollmershauser . |
| 3,266,771 | 11/1964 | Morley . |
| 3,709,631 | 1/1973 | Karstensen et al. ............... 416/195 |
| 3,834,831 | 9/1974 | Mitchell ......................... 416/193 A |
| 3,844,679 | 10/1974 | Grondahl et al. ................... 416/95 |
| 3,887,298 | 6/1975 | Hess et al. . |
| 3,972,645 | 8/1976 | Kasprow . |
| 4,012,167 | 3/1977 | Nobel ............................... 415/115 |
| 4,047,837 | 9/1977 | Hueber et al. ...................... 416/95 |
| 4,101,245 | 7/1978 | Hess et al. . |
| 4,177,013 | 12/1979 | Patterson . |
| 4,178,129 | 12/1979 | Jenkinson ..................... 416/193 A |
| 4,182,598 | 1/1980 | Nelson . |
| 4,280,795 | 7/1981 | Trousdell . |
| 4,457,668 | 7/1984 | Hallinger ............................ 416/95 |
| 4,505,642 | 3/1985 | Hill ............................... 416/193 A |
| 4,522,562 | 6/1985 | Glowacki et al. ................... 416/95 |
| 4,668,167 | 5/1987 | Le Maoût et al. ............ 416/193 A |
| 4,743,164 | 5/1988 | Kalogeros ...................... 416/193 A |
| 4,767,260 | 8/1988 | Clevenger et al. ................. 415/115 |
| 4,784,573 | 11/1988 | Ress, Jr. . |
| 4,820,116 | 4/1989 | Hovan et al. ..................... 415/115 |
| 4,872,810 | 10/1989 | Brown et al. ..................... 416/145 |
| 4,882,902 | 11/1989 | Reigele et al. .................... 415/115 |

FOREIGN PATENT DOCUMENTS 2155211   5/1973   France .

Primary Examiner—Edward K. Look
Assistant Examiner—Michael S. Lee
Attorney, Agent, or Firm—Jerome C. Squillaro

[57] ABSTRACT

Sheet Metal thermal control dampers are disposed in the cavities between turbine blades to bear against the undersides of opposed blade platforms portions of angularly adjacent blades under centrifugal loading to dampen blade vibrations and to seal the gaps between platforms against the radial flow of working fluid into the interblade cavities. The dampers are configured to cooperate with forward and aft seals to also block the axial flow of working fluid through the interblade cavities. Holes are provided in the dampers through which cooling air introduced into the interblade cavities can flow into contact with the platform undersides and cool the platforms, thereby controlling temperature rise in the blade attachment structure.

19 Claims, 3 Drawing Sheets

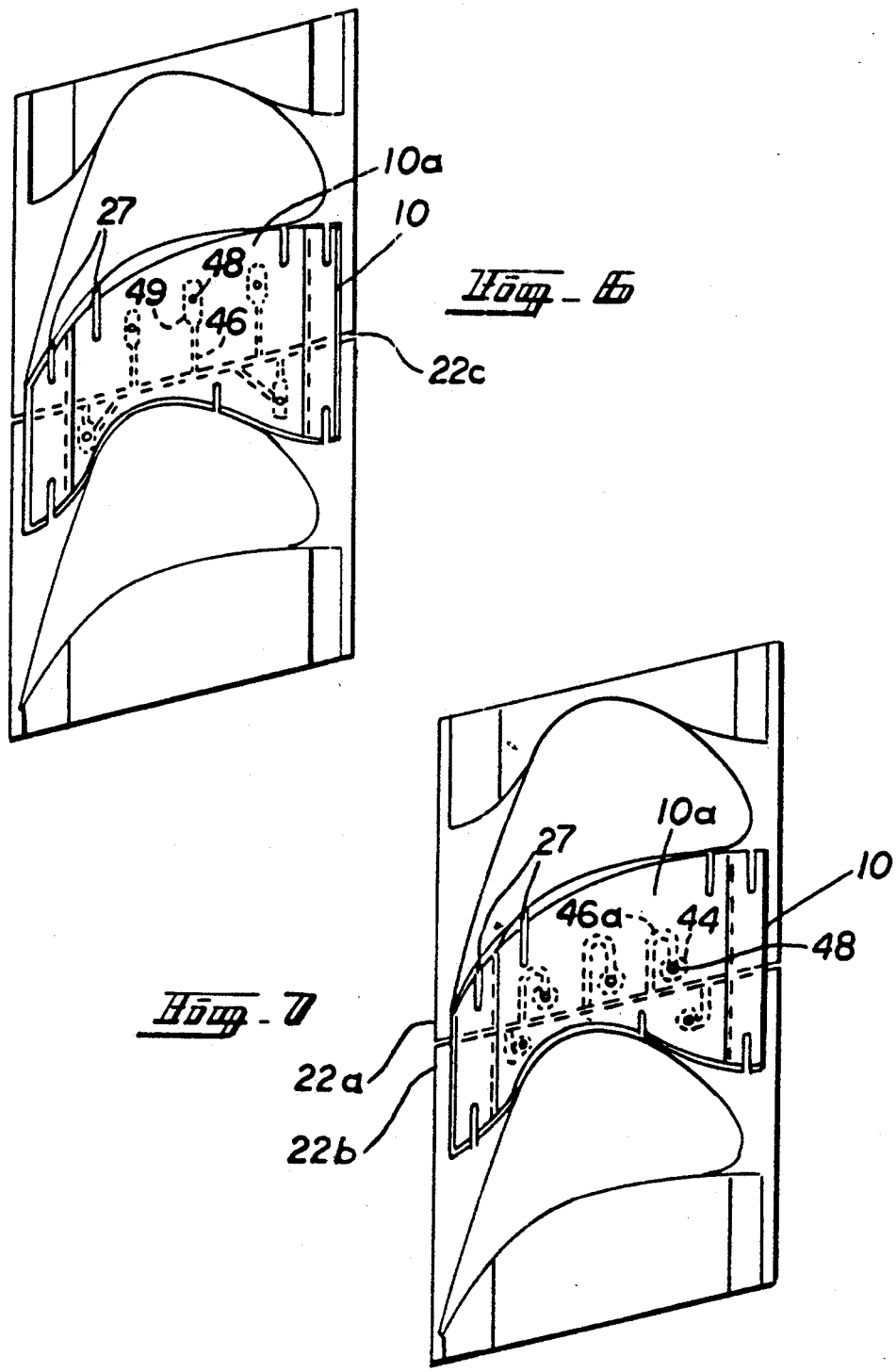

THERMAL CONTROL DAMPER FOR TURBINE ROTORS

The Government has rights in this invention pursuant to Contract No. F33615-87-C-2764 awarded by the Department of the Air Force.

BACKGROUND OF THE INVENTION

1. Field of the Invention

The present invention relates to gas turbine engines and particularly to vibration damping of turbine rotor blades and controlling the temperature of blade attachment structures.

2. Description of Related Art

Gas turbine engines include turbine sections comprising a plurality of blades or buckets mounted to the periphery of a rotor wheel or disk in angularly spaced relation. The turbine blades of typically plural rotor disk stages project into an axially flowing hot gas stream to convert the kinetic energy of this working fluid to rotational mechanical energy. To accommodate material growth and shrinkage due to variations in temperature and centrifugal forces, the blades are typically provided with roots of a "fir tree" configuration, which are captured in dovetail slots in the rotor disk periphery. During engine operation, vibrations are induced in the turbine buckets. If left unchecked, these vibrations can result in premature fatigue failures in the blades.

To dissipate the energy of these vibrations and hence lower vibrational amplitude and associated stresses, it is common practice to dispose dampers between the blades and the disk or between adjacent blades in positions to act against surfaces of tangentially projecting blade platforms. When the turbine disk rotates, the dampers are pressed against the platform surfaces by centrifugal forces. As the blades vibrate, the damper and platform surfaces slide on each other to produce frictional forces effective in substantially absorbing and thus dissipating much of the vibrational energy.

In addition to vibration damping, another important consideration is controlling the temperature of the blades. The airfoil portion of the blades are directly subjected to the high temperature working fluid and thus are typically cooled by air tapped from an upstream compressor and channelled through internal blade passages. It is also important that the platforms, roots and shanks blade attachment structure (blade and disk posts) not overheat. The blade platforms serve as shrouds defining the radially inner bounds of the working fluid annular flow path through the turbine section and thus are also directly subjected to the high temperatures of the working fluid. However, there are necessarily axially extending gaps between the platforms of adjacent blades through which the hot working fluid can be ingested radially into the interblade cavities beneath the platforms. It is known to utilize vibration dampers that assume damping positions against the undersides of the platforms spanning these axially extending gaps to block the radial flow of working fluid into the interblade cavities.

These known damper/seals are not however effective in sealing the circumferentially extending gaps at the forward (upstream) and aft (downstream) edges of the platforms. Even with the addition of forward and aft seals, it is found that working fluid leaks past these seals to produce an axial flow of high temperature gases washing through the interblade cavities under the motivation of the working fluid pressure differential existing between the upstream and downstream sides of the blades. This "in-wash" of working fluid has a compound effect on the temperature of the blade attachment structure. The working fluid heats the blade platforms and shanks by convection, which then become thermal radiators and conductors propagating heat to the blade roots and the disk posts. Excessive heat coupled with the mechanical loadings experienced under turbine operating conditions can lead to premature material failure of the blade attachment structure.

SUMMARY OF THE INVENTION

It is accordingly an object of the present invention to provide a thermal control damper for protecting turbine rotor blades from premature failures due to vibrational and thermal stresses. That is, the thermal control damper of the present invention functions to both dissipate vibrational energy induced in the blades and ensure cool-running blade attachment structures. By effectively controlling the deleterious effects of blade vibration and excessive blade attachment structure heating, a long service life is achieved without resort to more robust blade designs. To these ends, the thermal control damper of the present invention is provided in the form of a metallic sheet confined in an interblade cavity between each angularly adjacent pair of blades attached to a turbine rotor disk. Upon rotation of the turbine rotor, each thermal control damper is pressed against conforming undersurfaces of the platforms of an adjacent blade pair by centrifugal loading to absorb vibrational energy induced in the blades and to seal the gap between blade platforms.

Each thermal damper sheet is formed having an intermediate top face, a radially inwardly offset forward face, and a radially inwardly offset aft face. The forward and aft damper faces cooperate with fore and aft seals, respectively, to block the upstream and downstream ends of the interblade cavity and thus restrict the flow of high temperature working fluid therethrough. Furthermore, the top face of the damper sheets is provided with holes which communicate with recesses and grooves in the platform undersurfaces to actively cool the blade platforms using compressor cooling air introduced into the interblade cavities.

The invention accordingly comprises the features of construction, combination of elements and arrangement of parts, all as described hereinafter, and the scope of the invention will be indicated in the claims.

BRIEF DESCRIPTION OF THE DRAWINGS

The foregoing aspects and other features of the invention are explained in the following description, taken in connection with the accompanying drawings where:

FIG. 6 is a fragmentary radially outward view taken from the under the thermal control damper of FIG. 1; and FIG. 7 is a fragmentary radially outward view taken from the under the thermal control damper of FIG. 1 having an alternate cooling passage groove with a serpentine shape.

Corresponding reference numerals refer to like parts throughout the several views of the drawings.

DETAILED DESCRIPTION OF THE INVENTION

Figure 1:
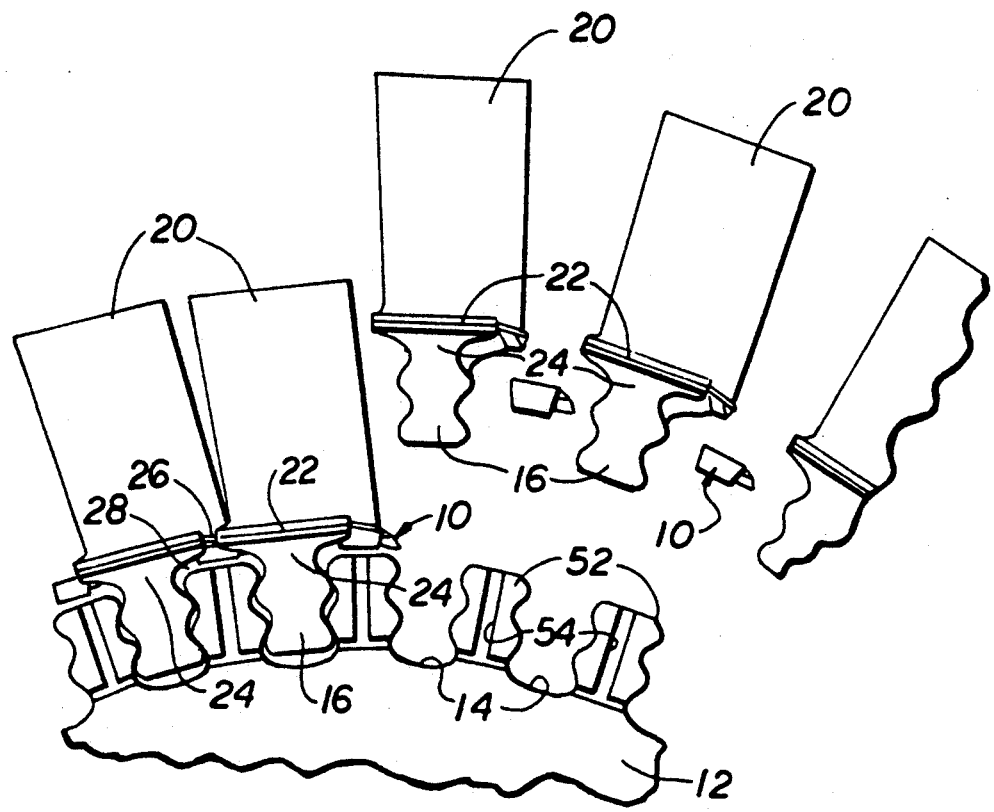
FIG. 1 is a fragmentary axial view, partially exploded, of a turbine rotor having a disk and blade combination utilizing thermal control dampers constructed in accordance with the present invention.
Figure 3:
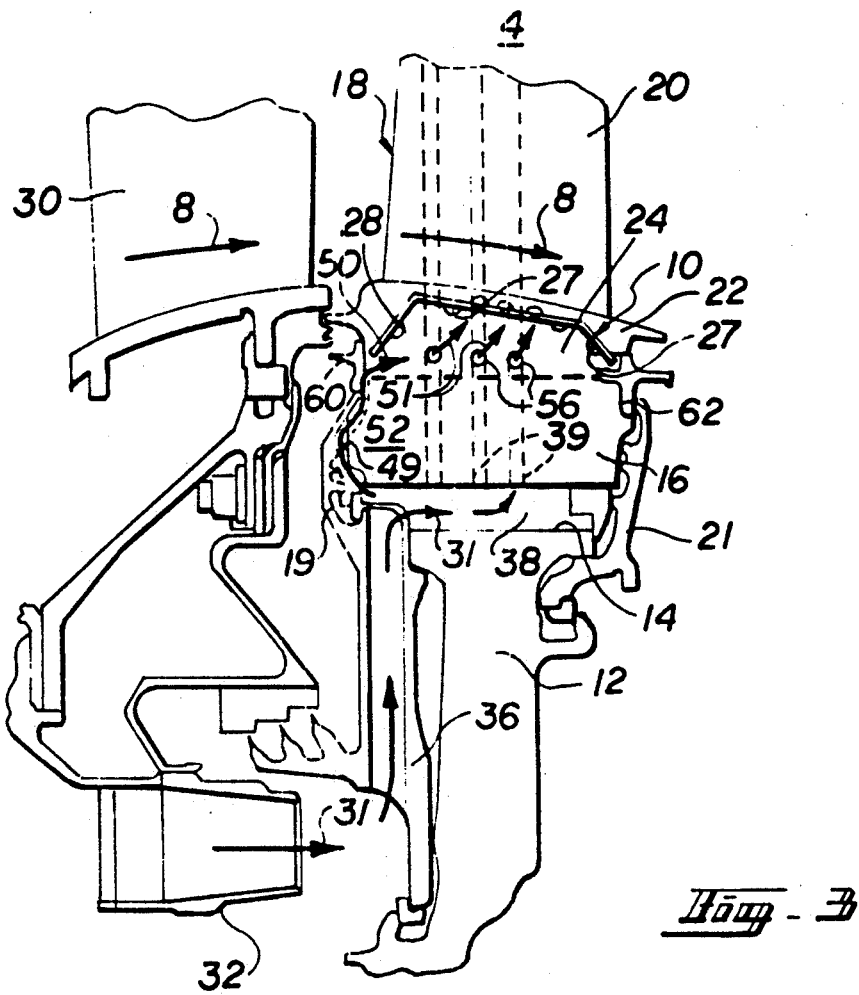
FIG. 3 is a fragmentary, axial cross-sectional view of a first stage turbine rotor having a disk and blade combination of FIG. 1 illustrating active cooling of the blade platforms and shanks.

The thermal control damper of the present invention, generally indicated at 10 in FIGS. 1 and 3, is illustrated in its application to gas turbine engines including a turbine disk 12 having a plurality of axially extending dovetail slots 14 formed in the disk periphery at uniformly, circumferentially spaced intervals. Fitted into each of these slots is the conforming root 16 of a turbine blade, generally indicated at 18. Forward 19 and aft 21 blade retainers then capture the blade roots in their slots, as seen in FIG. 3. Each blade includes an airfoil 20 projecting radially outwardly into the hot gas stream or working fluid flowing axially, as indicated by arrows 8 in FIG. 3, through a gas turbine engine. At the base of each airfoil is an integral platform 22 which is spaced from root 16 by an integral interconnecting shank 24. The platforms of each adjacent pair of blades extended tangentially toward each other and terminate in circumferentially spaced edges defining axially elongated gaps 26. Since the platforms serve as shrouds defining the radially inner bounds of the working fluid flow path past a turbine stage, these gaps are open to radially inward flow of high temperature gases into interblade cavities 28 beneath the platforms. To preclude this situation a thermal control damper 10 of the present invention is disposed in each interblade cavity, and, upon rotation of disk 12, the dampers are pressed against the undersides of the platforms of each angularly adjacent blade pair in positions spanning and thus sealing gaps 26 in response to centrifugal forces.

Figure 2:
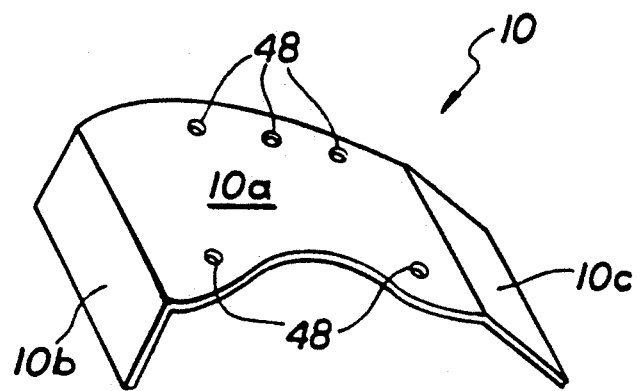
FIG. 2 is a perspective view of one of the thermal control dampers of FIG. 1.

Each thermal control damper 10 comprises, as seen in FIG. 2, a relatively thin sheet, preferably made of a high temperature resistant metal having high abrasive strength, such as a cobalt based alloy, of a thickness in the range of 15 to 40 mils. Note that this example is for an aircraft gas turbine engine or a derivative thereof and that larger turbines may employ a thicker sheet metal, for example 100 mils. The important criteria is that the thermal control damper 10 be sufficiently thin to effectively seal the gaps 26 in response to the centrifugal forces it is designed to be subjected to. The sheet is formed having a generally flat top face section 10a, a radially inwardly bent forward face section 10b, and a radially inwardly bent aft face section 10c. Referring to FIG. 3, it is seen that the platform undersurfaces are generally shaped such that the three damper face sections can achieve contact with the platforms over a large surface area for enhanced vibration damping performance. Stubby lugs 27, extend tangentially from the shank 24 to retain the dampers in their operative positions in the absence of centrifugal loading.

Illustrated in FIG. 3, is a first turbine rotor stage 4, including the turbine disk 12, immediately downstream from a turbine nozzle 30 to control the temperature of the turbine blade attachment structures. cooling air indicated by arrows 31 tapped from a compressor (not shown) is preferably introduced, in a conventional well known manner, through a tangential passage 32 into an impeller 36 which flows the cooling air to chambers 38 between the blade roots and the bottoms of the dovetail slots 14. As is customary, the cooling air in chambers 38 flows through internal passages (illustrated in phantom at 39) in the roots 16, shanks 24, and airfoils 20 to cool the blades during engine operation. However, this cooling air flowing through internal blade passages has little effect in cooling the blade platforms.

Figure 4:
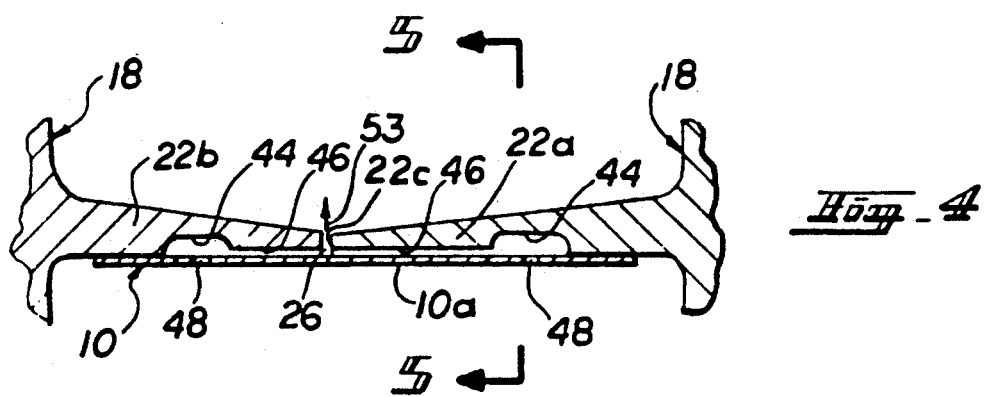
FIG. 4 is a fragmentary radial sectional view taken through opposed platform portions of angularly adjacent turbine blades of FIG. 1.
Figure 5:
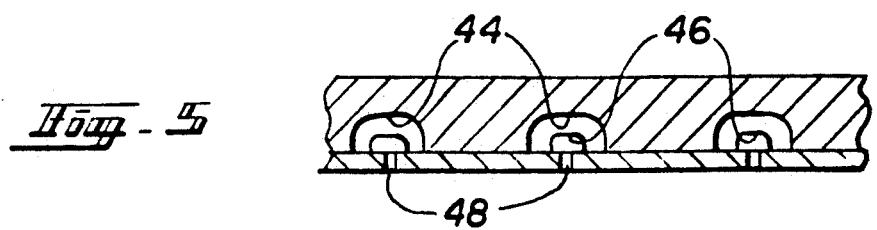
FIG. 5 is a sectional view taken along line 5—5 of FIG. 4.

As seen in FIG. 4, portions 22a of the blade platforms 22 extending from the pressure side of the blades are circumferentially elongated as compared to platform portions 22b extending from the suction side of the blades. It is against the undersides of these platform portions 22a and 22b that the top face section 10a of the thermal control dampers bear to seal gaps 26 and to damper blade vibration. As also seen in FIGS. 5 and 6, the underside of each platform portion 22a is formed with an axially arranged series of recesses 44 and interconnected grooves 46. Each groove 46 extends circumferentially from each recess 44 out to platform edge 22c at gap 26. Preferably, and as seen in FIG. 4, the same recess 44 and groove 46 arrangement is provided in the underside of platform portion 22b. Referring particularly to FIG. 6, the top face section 10a of each thermal control damper 10 is provided with a series of holes 48 arranged such that, with the dampers in their operative positions, a different hole 48 is registered with each platform recess 44. An alternative groove 46a may be curved or have a serpentine shape to further improve cooling of platforms 22a and 22b as shown in FIG. 7.

The compressor cooling air distributed into the chambers 38 is introduced (arrow 50 in FIG. 3) into the interblade cavities 28 through metering passages 49 between the disk posts 52 and the forward blade retainers 19 provided by radially extending surface grooves 54 in the forward faces of disk post 52 (FIG. 1) and/or metering passages 56 communicating with blade internal passages 39 (FIG. 3). Cooling air then flows from interblade cavities 28 through damper holes 48 (arrows 51 in FIG. 3) to impingement cool the platform material bounding recesses 44. The cooling air then flows through the passages defined by grooves 46 and the damper top face sections 10a to convection cool the platform portions 22a and 22b. Upon exiting these passages, the cooling air (arrows 53 in FIG. 4) film cools the platform edges defining gaps 26.

It is thus seen that by the controlled introduction of compressor cooling air into the interblade cavities, the blade shanks 24 and disk posts are further cooled and, by virtue of the damper impingement cooling holes 48 communicating with the recess and passages in the undersurfaces of platform portions 22a and 22b, the blade platforms are actively cooled. As a result, especially the blade platform temperature is controlled such that the platforms do not become heat conductors and radiators to unduly heat up the blade attachment structure (blade roots and disk posts). Cool running blade attachment structure is also assured by virtue of the cooperation between the forward and aft dampers face sections with forward 60 and aft 62 seals to prevent the axial flow of hot working fluid through the interblade cavities. It will be appreciated that cooling flowing through disk post grooves 54 also convections cool disk posts 52.

While the preferred embodiment of our invention has been described fully in order to explain its principles, it is understood that various modifications or alterations may be made to the preferred embodiment without departing from the scope of the invention as set forth in the appended claims.

We claim:

1. Apparatus for damping vibrations and for controlling the temperature of attachment structure securing blades to turbine disks of a gas turbine engine, said apparatus comprising, in combination:
   A) a damper disposed in an interblade cavity between each adjacent pair of angularly spaced blades of a turbine disk, said damper comprised of a metallic sheet configured to assume an operative position under centrifugal loading in surface contact with the undersurfaces of circumferentially opposed platform portions of an adjacent pair of blades, whereby to dampen vibrations in the adjacent blade pair and to seal a gap between axially extending edges of the opposed platforms portions, said damper further including a plurality of holes therein open to the interblade cavity; and
   B) means for cooling the blade attachment structure by introducing cooling air into the interblade cavity for flow through said holes to cool at least one of the opposed platform portions.

2. The apparatus defined in claim 1, wherein said metallic sheet of said damper is in the range of 15 to 40 mils thick.

3. The apparatus defined in claim 1, wherein said cooling means further includes a recess formed in the undersurface of said one opposed platform portions in registry with each said damper hole.

4. The apparatus defined in claim 3, wherein said cooling means further includes a separate groove formed in the undersurface of said one opposed platform portion extending from each said recess to the axially extending edge thereof, said cooling means operable to flow the cooling air such that the cooling air;
   1) flows through said holes into said recesses to impingement cool said one opposed platform portion,
   2) flows from said recesses through passages provided by said grooves and said damper to convection cool said one opposed platform portion, and
   3) flows from said passages into the gap to film cool the axially extending edges of the opposed platform portions.

5. The apparatus defined in claim 4, wherein said cooling means further includes additional recesses and grooves formed in the undersurface of the other said opposed platform portion, a separate hole in said damper registered with each of said additional recesses.

6. The apparatus defined in claim 1, wherein each blade includes an airfoil projecting radially outwardly from the platform, a shank projecting radially inwardly from the platform, and a root joined to the radially inner end of the shank, the root being captured in a slot in the turbine disk periphery by forward and aft retainers, said damper is formed having an intermediate top face section containing said holes, an radially inwardly turned forward face section and a radially inwardly turned aft face section, all in contact with the undersurfaces of the opposed platform portions, said forward and aft face sections being in partially lapped relation with forward and aft seals, respectively, to block the axial flow of hot working fluid through the interblade cavity.

7. The apparatus defined in claim 1, wherein each said blade includes an airfoil projecting radially outwardly from the platform into an axially flowing working fluid stream, a shank projecting radially inwardly from the platform, and a root joined to the radially inner end of the shank, the root being captured in a slot in the turbine disk periphery, each adjacent pair of disk slots being separated by a disk post, said cooling means includes at least one cooling passage accommodating the flow of cooling air from a gap between the blade root and the disk slot into the interblade cavity.

8. The apparatus defined in claim 7, wherein each blade includes at least one internal passage extending radially through the root, shank and airfoil to accommodate cooling air flow therethrough from the gap between the blade root and disk slot, said cooling passage communicating with said internal passage.

9. The apparatus defined in claim 7, wherein said cooling passage is formed in the disk post.

10. The apparatus defined in claim 8, wherein said cooling passage is defined by a groove in a radial face surface of the disk post and one of the retainers.

11. The apparatus defined in claim 7, wherein said cooling means further includes a recess formed in the undersurface of at least one of said opposed platform portions in registry with each said damper hole.

12. The apparatus defined in claim 11, wherein said cooling means further includes a separate groove formed in the undersurface of said one opposed platform portion extending from each said recess to the axially extending edge thereof, said cooling means operable to flow the cooling air such that the cooling air;
   1) flows through said holes into said recesses to impingement cool said one opposed platform portion,
   2) flows from said recesses through passages provided by said grooves and said damper to convection cool said one opposed platform portion, and
   3) flows from said passages into the gap to film cool the axially extending edges of the opposed platform portions.

13. The apparatus defined in claim 12, wherein said cooling means further includes additional recesses and grooves formed in the undersurface of the other said opposed platform portion, a separate hole in said damper registered with each said additional recess.

14. The apparatus defined in claim 13, wherein each blade includes at least one internal passage extending radially through the root, shank and airfoil to accommodate cooling air flow therethrough from the gap between the blade root and disk slot, said cooling passage communicating with said internal passage.

15. The apparatus defined in claim 13, wherein said cooling passage is formed in the disk post.

16. The apparatus defined in claim 14, wherein said cooling passage is defined by a groove in a radial face surface of the disk post and one of the retainers.

17. The apparatus defined in claim 13, wherein said damper is formed having an intermediate top face section containing said holes, a radially inwardly turned forward face section and a radially inwardly turned aft face section, all in contact with the undersurfaces of the opposed platform portions, said forward and aft face sections being in partially lapped relation with forward and aft seals, respectively, to block the axial flow of hot working fluid through the interblade cavity.

18. The apparatus defined in claim 17, wherein said metallic sheet of said damper is in the range of 15 to 40 mils thick.

19. The apparatus defined in claim 5, wherein said grooves formed in the undersurface of said opposed platform portions have serpentine shapes.

* * * * *